(12) United States Patent
Uppal et al.

(10) Patent No.: US 12,513,132 B2
(45) Date of Patent: Dec. 30, 2025

(54) WEB-APP AUTHENTICATION AND AGENT HANDOFF

(71) Applicant: Microsoft Technology Licensing, LLC, Redmond, WA (US)

(72) Inventors: Siddharth Uppal, Bothell, WA (US); Prem Sai Reddy Kareti, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 18/669,329

(22) Filed: May 20, 2024

(65) Prior Publication Data

US 2025/0358271 A1   Nov. 20, 2025

(51) Int. Cl.
*H04L 9/40* (2022.01)

(52) U.S. Cl.
CPC ........ *H04L 63/0815* (2013.01); *H04L 63/083* (2013.01)

(58) Field of Classification Search
CPC .......... H04L 63/0815; H04L 63/083
See application file for complete search history.

(56) References Cited

U.S. PATENT DOCUMENTS

| | | | |
|---|---|---|---|
| 2012/0264402 A1* | 10/2012 | Zhang | H04W 12/069 455/411 |
| 2018/0077143 A1 | 3/2018 | Sridharan | |
| 2018/0332042 A1 | 11/2018 | Yu | |
| 2018/0375865 A1 | 12/2018 | Seibert, Jr. | |
| 2019/0372957 A1* | 12/2019 | Dunjic | G06Q 20/322 |
| 2023/0412382 A1* | 12/2023 | Palanisamy | H04L 63/104 |

OTHER PUBLICATIONS

International Search Report and Written Opinion received for PCT Application No. PCT/US2025/017094, Apr. 17, 2025, 14 pages.

* cited by examiner

*Primary Examiner* — Sm A Rahman
(74) *Attorney, Agent, or Firm* — Schwegman Lundberg & Woessner, P.A.

(57) ABSTRACT

Disclosed in some examples are methods, systems, and machine-readable medium that enable a seamless handoff of authentication states between an application of a first service (e.g., a web-application) and a component of the first service that invokes a function within the second application (e.g., such as bots or agents of the first service executing within collaborative platforms of a second service). This may be accomplished through the use of a link that encodes a nonce.

20 Claims, 8 Drawing Sheets

WEB-APP AUTHENTICATION AND AGENT HANDOFF

TECHNICAL FIELD

Embodiments pertain to authentication. Some embodiments relate to authentication of a component of a first service executing within a second application of a second service based upon a previous authentication within a first application of the first service.

BACKGROUND

Authentication processes allow for securing features of computing systems or data held by those systems by verifying the identity of users or other requestors before granting them access to the data or features. Common authentication methods include requiring the user provide credentials such as a username and password, biometric verification, and the like. Multi-factor authentication (MFA) may also be used which may involve combinations of other authentication methods along with SMS-based codes, email links, or authentication applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some applications allow for the development and deployment of components such as plug-ins that run within an execution environment of the application. The application and the component have a symbiotic relationship: the application's functionality is extended by the component and the component's functionality is enhanced by having access to features of the host application. For example, a plug-in component in a unified communication application such as Microsoft TEAMS® may extend its functionality by utilizing the communication features of the unified communication application while at the same time, the unified communication application's features are extended by the functionality provided by the component.

In some examples, the plug-in component may be related to a separate service that is distinct from the service of the host application. For example, a first application of a first network-based service may have an associated plug-in component that functions within a second application provided by a second network-based service. One challenge with this situation is seamlessly connecting the user experience between the first application and the associated plug-in component. For example, a user must separately authenticate in both the first application and the associated plug-in component. For example, a user already authenticated within a web-based project management application may encounter friction when attempting to interact with a plug-in of the project management application (e.g., a bot) that is executing within a collaborative platform like Microsoft Teams. Typically, this would require the user to undergo a separate authentication process for the component, even though the user is already authenticated on the web application.

This extra authentication not only hampers the user experience but also affects security and productivity by introducing unnecessary delays and complexity. The challenge is maintaining security while still providing a seamless user experience across different platforms. Traditional methods often involve trade-offs between security and convenience, where enhancing one can adversely affect the other. Therefore, there is a need for an improved authentication system that allows for a seamless transition between applications and associated components without requiring repeated authentication, all while maintaining high security standards to prevent unauthorized access.

Disclosed in some examples are methods, systems, and machine-readable medium that enable a seamless handoff of authentication states between a first application (e.g., a web-application) of a first service and a component of the first service executing within the second application (e.g., such as bots or agents). In some examples, a user authenticates with the first application (e.g., a web application) of the first service. This authentication process creates an authentication token that is used by the first application to request data or services via an Application Programming Interface (API) from a back-end server of the first service. The user initiates a handover process via a user interface element in the first application that causes the first application service to create a unique nonce linked to the token. This nonce is then passed to the component of the first service executing within the second application via embedding of the nonce within a hyperlink (e.g., within a continuationToken) that uses a custom URI scheme of the second application. The link, when activated, launches the second application via the custom URI scheme and provides both the nonce and an identifier of the component to the second application. The second application then launches (or installs if the component is not already installed) the component and provides the nonce to that component. The component is then able to access the first service without a separate login by using the nonce to access the API of the first service. The first service may utilize the nonce as a reference to the previously obtained token and pass the API request to the back-end server of the first server using the referenced token.

In this manner, a user may be seamlessly transferred between a first application of a first service and a component of the first service within a second application. This both enhances security by reducing the number of login-attempts and thus reducing the chance of interception of the user's credentials as well as enhancing the user experience by eliminating the need for re-authentication. This mechanism simplifies user interactions without reducing security through controlled authentication mechanisms.

The present disclosure addresses the technical problem of the security risks related to the need for repeated sign-ins when accessing the same data across application platforms as each authentication step could potentially expose user credentials to interception or misuse. This technical problem is solved using the technical solution described herein that use the creation of a unique single session-use nonce and its incorporation into a hyperlink, such as a deep link. This mechanism facilitates a seamless handoff of the user's authenticated state from the web application to the collaborative platform, mitigating the risks of interception of a user's credentials through the repeated authentication attempts.

Figure 1:
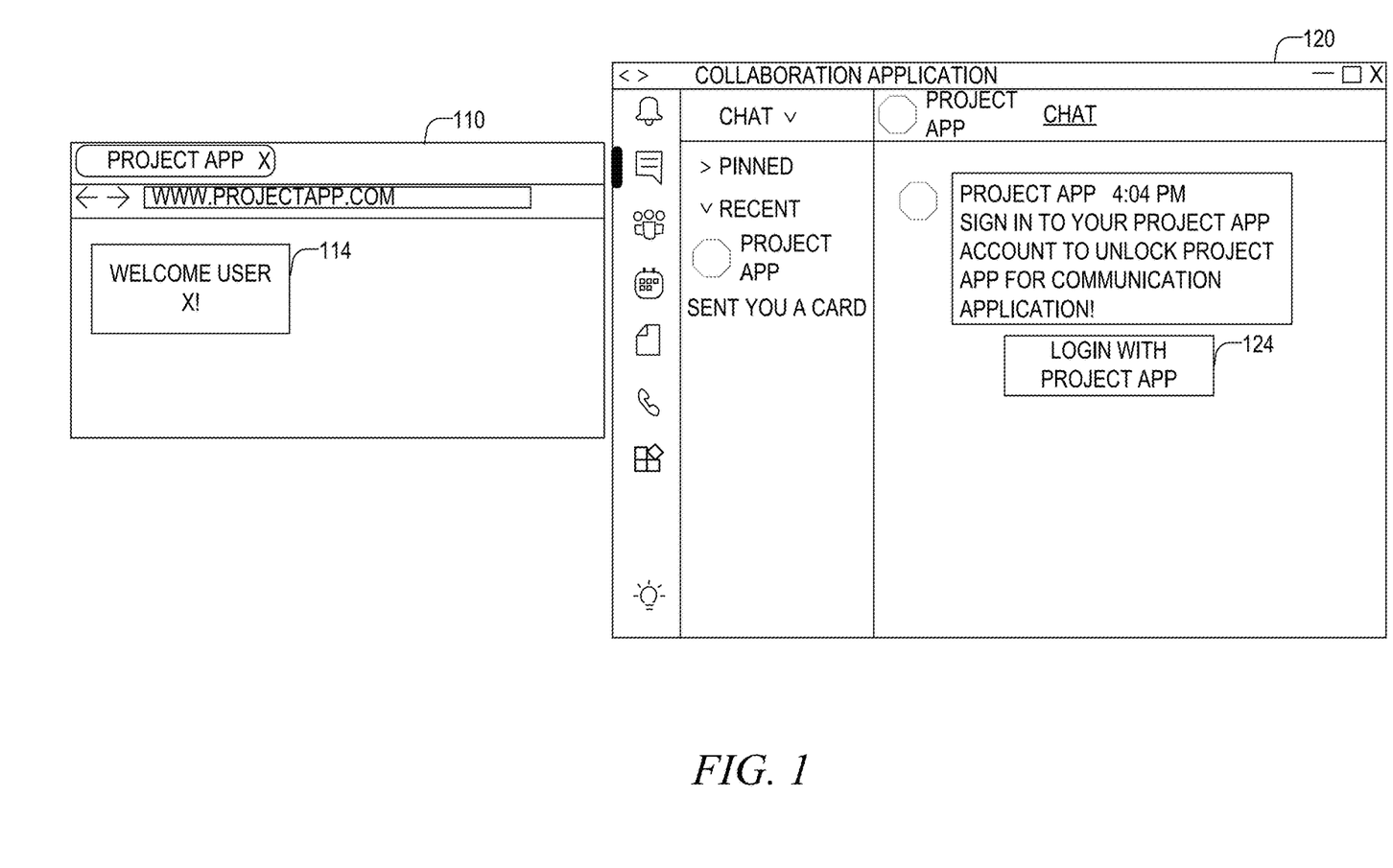
FIG. 1 illustrates a GUI of a first application and a GUI of a second application according to some examples of the present disclosure.

FIG. 1 illustrates a GUI 110 of a first application and a GUI of a second application 120 according to some examples of the present disclosure. As shown in FIG. 1, the first application is a project management application and the second application is a collaboration application, but a person of ordinary skill in the art will appreciate that any applications may be utilized. In FIG. 1, the user is already logged into a web application associated with project application as illustrated by the GUI 110 of the project application and the welcome indication 114.

The second application, the collaboration application in FIG. 1, allows for a component—e.g., of a software service (e.g., a different service than that which may be associated with the second application), to invoke one or more functions within the second application. Example such components may include so-called third-party plug-ins that are software components that add specific features or functionality to the first application and may work within the first application. Example functions that may be invoked in a collaboration application may include chat functions, voice call functions, video call functions, or the like. Other second applications may allow for other functions to be invoked by components.

In the example of FIG. 1, a project application has added a chatbot component of the first application (e.g., the project management application) to the second application. The chatbot is utilizing the messaging functions of the second application to communicate with a user through a chat window of the collaboration application. If the user wants to move from the web-based application of the project application to the component within the second application—e.g., the chatbot within collaboration application, the user must login at the plug-in using the login button 124 and then separately enter their username or password despite the fact that the user is already logged into their account at the web-based project application.

Figure 2:
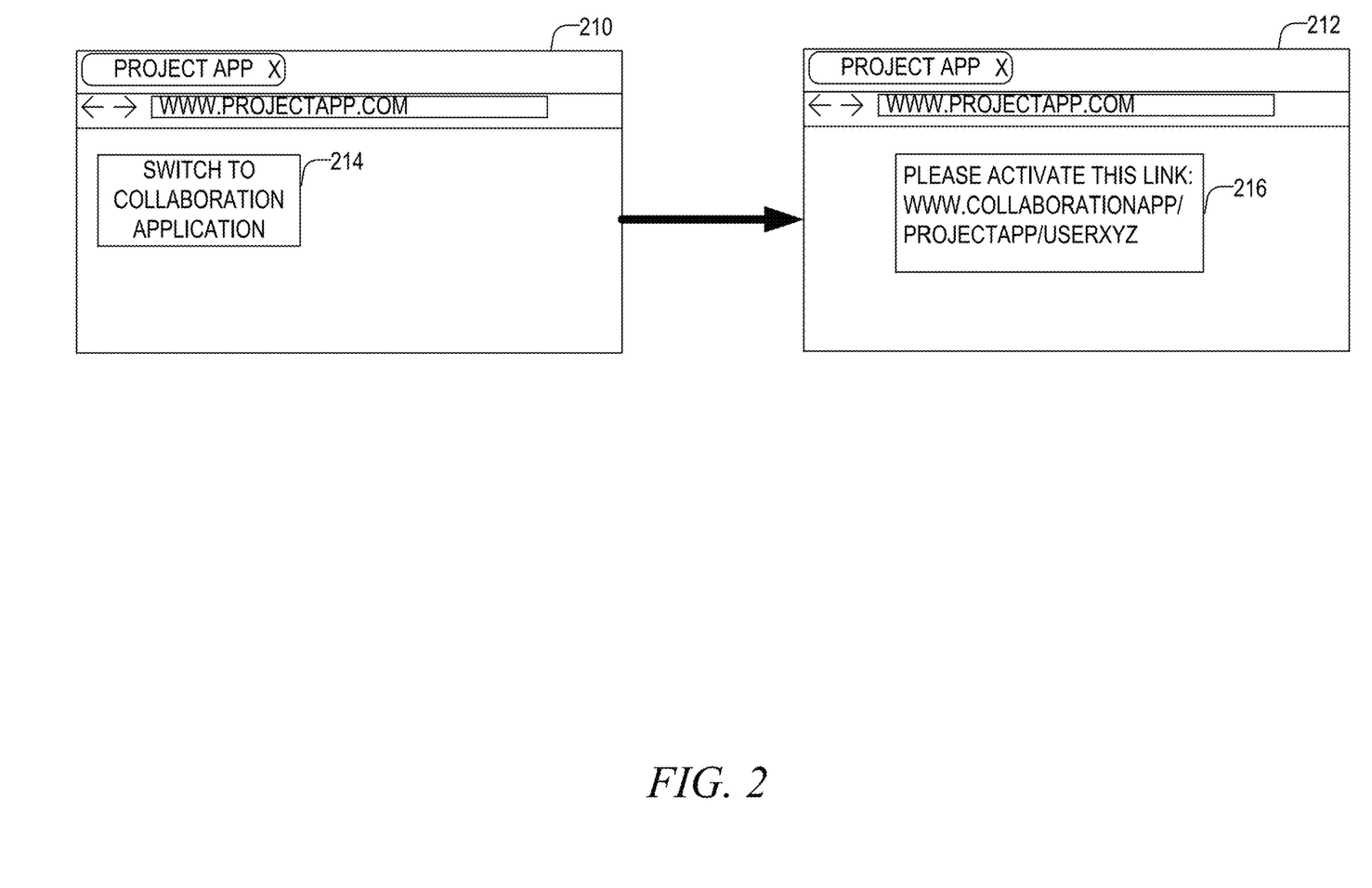
FIGS. 2-3 illustrate a GUI sequence showing a seamless authentication of the component of the first application within the second application according to some examples of the present disclosure.
Figure 3:
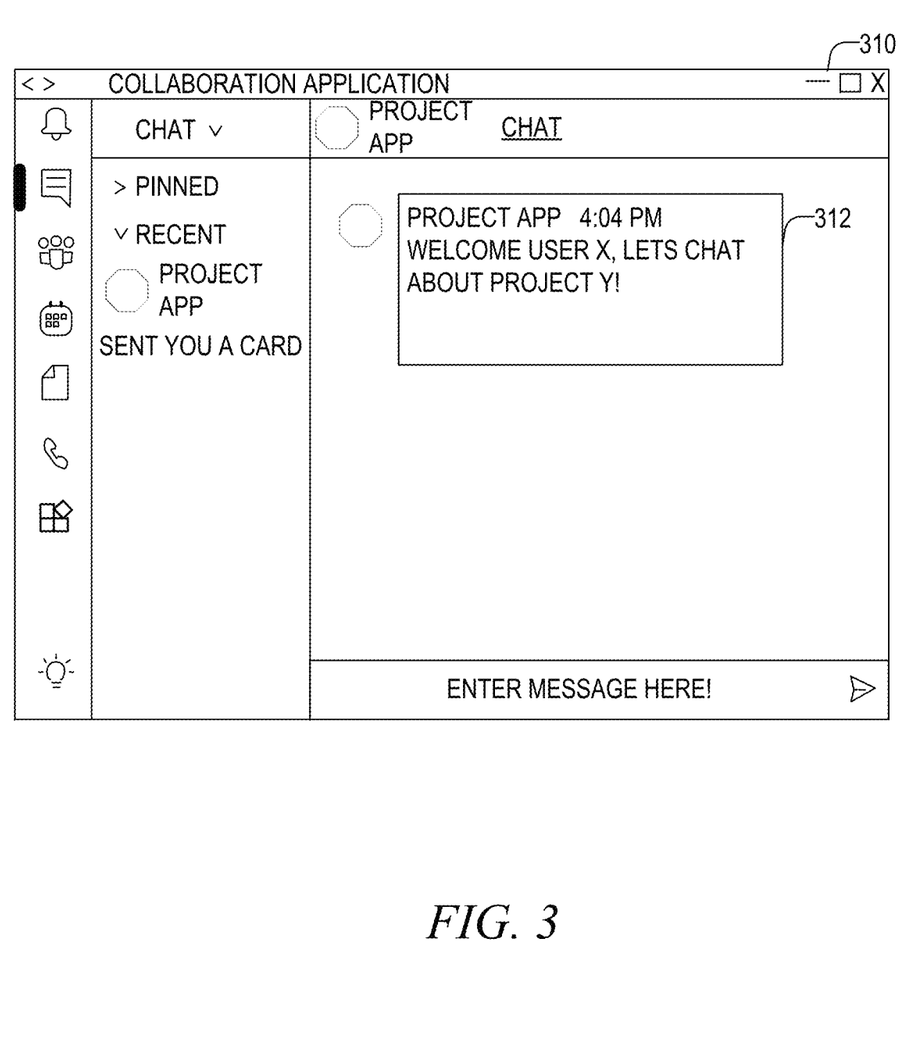

FIGS. 2-3 illustrate a GUI sequence showing a seamless authentication of the component of the first application within the second application according to some examples of the present disclosure. The user is authenticated within the project application (first application) as shown in the GUI 210. The user is then presented with a button or control 214 to switch or otherwise authenticate to the component of the first application within the second application. Upon activating the button or control 214, the GUI 210 transitions to GUI 212 which displays a link 216. Upon activating the link 216, the user is taken to the second application. This is shown in FIG. 3, where the GUI 310 of the second application is activated by the link which then takes the user directly to the component of the first application within the second application. In the example of FIG. 3, the link includes a nonce which is then used by the component to authenticate with a service of the first application (e.g., one or more servers) providing a seamless authentication experience for the user. This is indicated by the chat message 312 of the GUI 310. In some examples, the link may be automatically activated for the user and the user may be taken to the component automatically and logged in on that component automatically.

Figure 4:
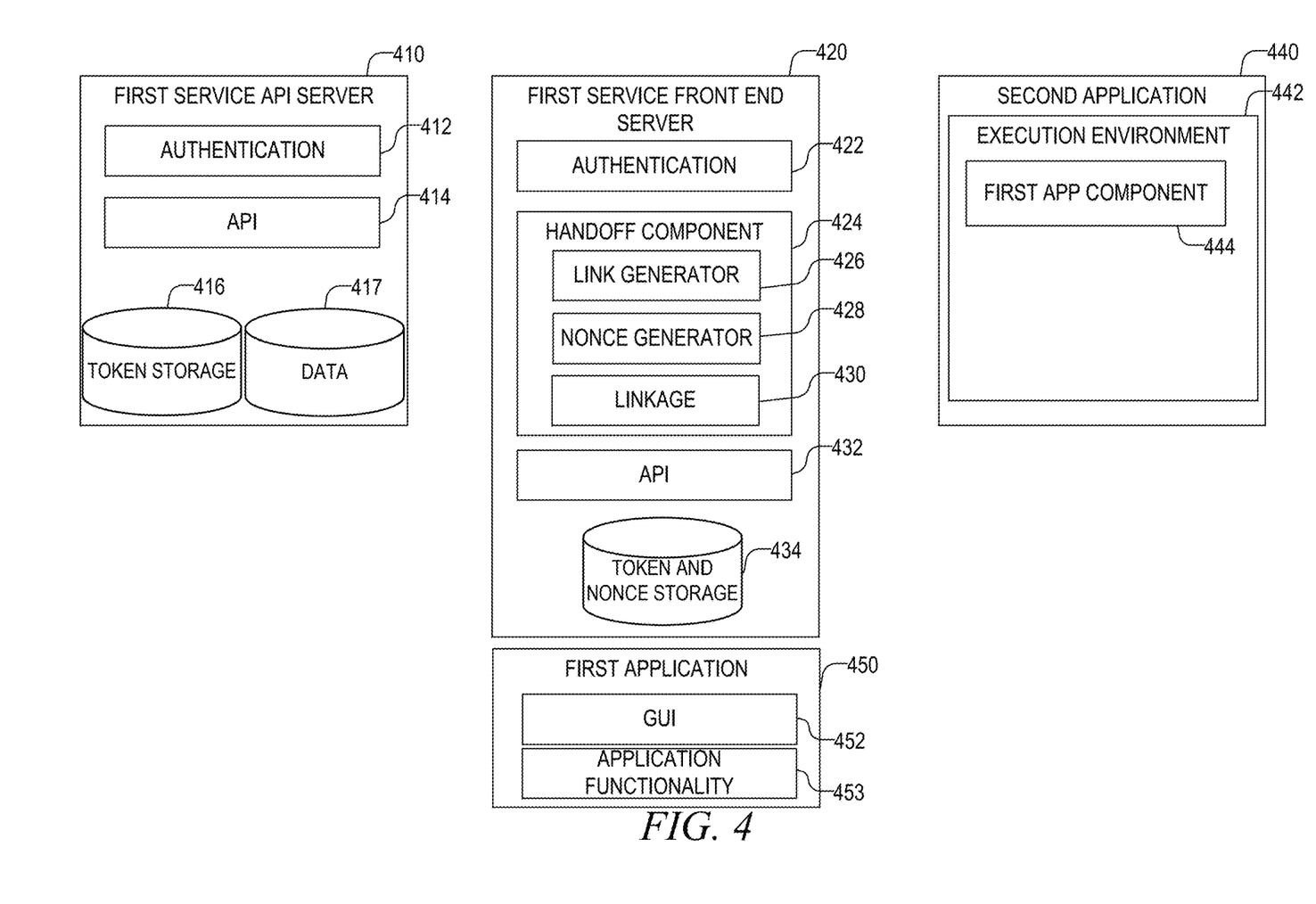
FIG. 4 illustrates logical components of an integrated application ecosystem including a first service API server, a first service front-end server, a first application, and a second application according to some examples of the present disclosure.

FIG. 4 illustrates logical components of an integrated application ecosystem including a first service API server, a first service front-end server, a first application, and a second application according to some examples of the present disclosure. In some examples, the second application may be served by a second application service which may include a second service API server and front end server. These components are not shown for clarity.

The first service API server 410 handles requests for data in data store 417 which may be user data, account data, service data, or the like. These requests may be from applications or components associated with the first service and in some examples may be from a front-end server, such as first service front end server 420. The authentication component 412 may authenticate users of the API, such as other servers of the service and/or applications. Authenticated users are assigned an authentication token, which may be stored in the token storage 416. API component 414 handles API calls by parsing the request message to identify the authentication token. The API component 414 then confirms that the user or application is authenticated (e.g., by checking a token in the authentication request against valid tokens in the token storage 416). If the user or application is authenticated, the API component 414 may search the data store 417 for data responsive to the API request. Data that is responsive to the request is provided in a response to the user or application.

The first service front end server 420 interfaces between a first application 450 and the first service API server 410 by managing requests for data, authentication, and other tasks. In some examples, the first service front end server 420 may be a web server that serves the first application 450 to user's browsers. The first application 450 includes a GUI component 452 which provides the graphical user interface, which is the main interface for user interaction. The application functionality component 453 receives user input from the GUI component 452 and provides output to the GUI component 452 to provide the application's operational capabilities. This component executes the core functions of the application, handling data processing, task execution, and response generation based on user interactions. In some examples, the first application 450 may communicate with the first service front end server 420 to make data requests, receive user data, and the like.

The first service front end server 420 may include authentication module 422 that manages security and authentication. This module establishes and maintaining secure access to the service. It authenticates users by verifying their credentials and manages session integrity by obtaining an API authentication token from the first service API server

410. This token secures the user's session and enables subsequent API interactions used for the application's functionality.

The API component 432 interfaces with the first service API server 410. It handles the execution of API calls on behalf of the first application 450, utilizing the authentication token to access and retrieve necessary data from the data store 417.

The handoff component 424 allows for a transition or establishment of the user session to a component of the first service within a second application 440 of a second service. It comprises the link generator 426, which constructs a hyperlink (e.g., a deep link) embedding a nonce along with other parameters such as a custom URI scheme and an identifier of the component. The nonce generator 428 creates a unique nonce for each session, enhancing security by ensuring that each handoff is uniquely identifiable and cannot be reused or replayed. The linkage component 430 links the nonce with the user's API authentication token and stores that linkage in the token and nonce storage data store 434.

The API component 432 also provides an interface for the first application component 444 operating within the execution environment 442 of the second application 440. The first application component 444 may send API requests for the first service API server 410 to the API component 432 of the first service front end server 420. These API requests may utilize the nonce rather than the token. The API component 432 may use the nonce to authenticate the component and then substitute the nonce for the token when making calls to the first service API server 410 on behalf of the component. The response from the first service API server 410 may be relayed back to the first application component 444 via the API component 432 from the first service API server 410.

Second application 440 may be any application, but in some examples, it may be a collaboration application such as a unified communication application such as Microsoft TEAMS®. Execution environment 442 may be a secure and isolated execution environment, such as a brower-based execution environment that may be based upon web technologies like HyperText Markup Language, JavaScript, React, and others. In some examples, the execution environment may be sandboxed and isolated from the code and memory of the second application 440 to prevent the first application component 444 from accessing or modifying data or resources without authorization. First application component 444 may be any software component that executes within another software application and may be a plug-in. In some examples, a plugin is a custom software component or add-on that extends the functionality of an existing application or system. It is a piece of code that can be integrated into a host application to provide additional features, capabilities, or customizations. In some examples, the plug-in may access one or more functions of the host application. In the example where the host application is a unified communication application, the plug-in may access the communication capabilities of the host application.

Figure 5:
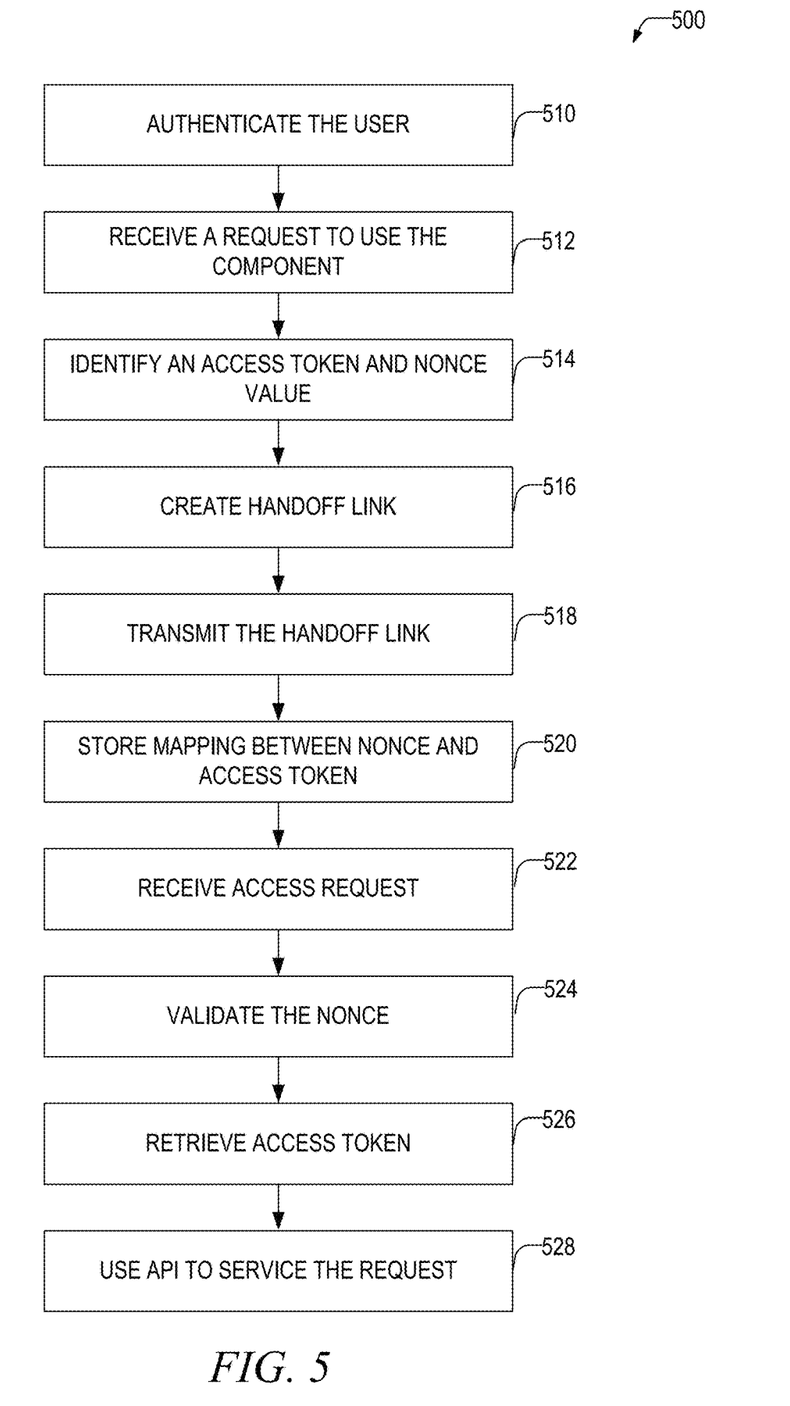
FIG. 5 illustrates a flowchart of a method for facilitating a seamless user authentication transition from a first application of a first service to a component of the first service executing within a second application of a second service according to some examples of the present disclosure.

FIG. 5 illustrates a flowchart of a method 500 for facilitating a seamless user authentication transition from a first application of a first service to a component of the first service executing within a second application of a second service according to some examples of the present disclosure. In some examples, method 500 may be performed by a front-end server of a first service. At operation 510, the server of the first application authenticates a user. This step establishes the user's identity before any sensitive operations or data transfers occur. This authentication may include the user providing their credentials for their account, entering a one-time-passcode, or the like. In some examples, the server at this point uses the credentials to authenticate with an API server by obtaining an API token. This API token may then be stored and used for subsequent API calls to the API server related to the user's account on the first service.

Following the user's authentication, at operation 512, the server receives a request from the user to use a component included in the first service for invoking a function executing within the second application. This request may be triggered from a GUI in the first application. In response to both the authentication and the request, at operation 514, the server identifies an access token (e.g., the API token) and a nonce value. The access token serves as proof that the user is authenticated within the first application, while the nonce is a unique, time-limited token that is linked to the access token.

At operation 516, a handoff link is created, which includes an instruction with an address that references the second application and incorporates the nonce value. This link is designed to initiate an authenticated session between the user and the component of the first service executing within the second application. The creation of this handoff link ensures a smooth transition without requiring the user to re-authenticate.

The server then transmits the handoff link to a computing device corresponding to the second application at operation 518. At operation 520, the server stores a mapping of the nonce value to the access token in a mapping table. This mapping links the user's session across different applications securely. The access token authenticates API calls to backend servers of the first application, ensuring that all subsequent operations are performed under authenticated conditions.

At operation 522 the server receives, at the address corresponding to the handoff link, a request from the component included in the first service for invoking a function executing within the second application to authenticate the user with the component, the request comprising the nonce value. Upon receiving this request, at operation 524, the server validates the nonce value included in the request. Successful validation confirms the integrity and authenticity of the transition, allowing the process to move forward. The nonce may be validated by ensuring that a record in a data store of the server includes an entry mapping the received nonce to a valid token and that the nonce has not expired as the nonce may have a time-to-live value to enhance security.

At operation 526, the server uses the received nonce value to retrieve the corresponding access token from the mapping table. The retrieved access token is then used at operation 528 to authenticate API calls to servers of the first application in response to requests from the component, without requiring the component to re-authenticate. This final step ensures that the user can continue their interaction with the second application seamlessly, leveraging the authenticated state established in the first application, as detailed in the disclosure document and the claims.

In some examples, the first application and the component included in the first service for invoking a function executing within the second application (e.g., a plugin) may be executing on a same device. In other examples, they may be on a different device. For example, the user may send the link to another device.

Figure 6:
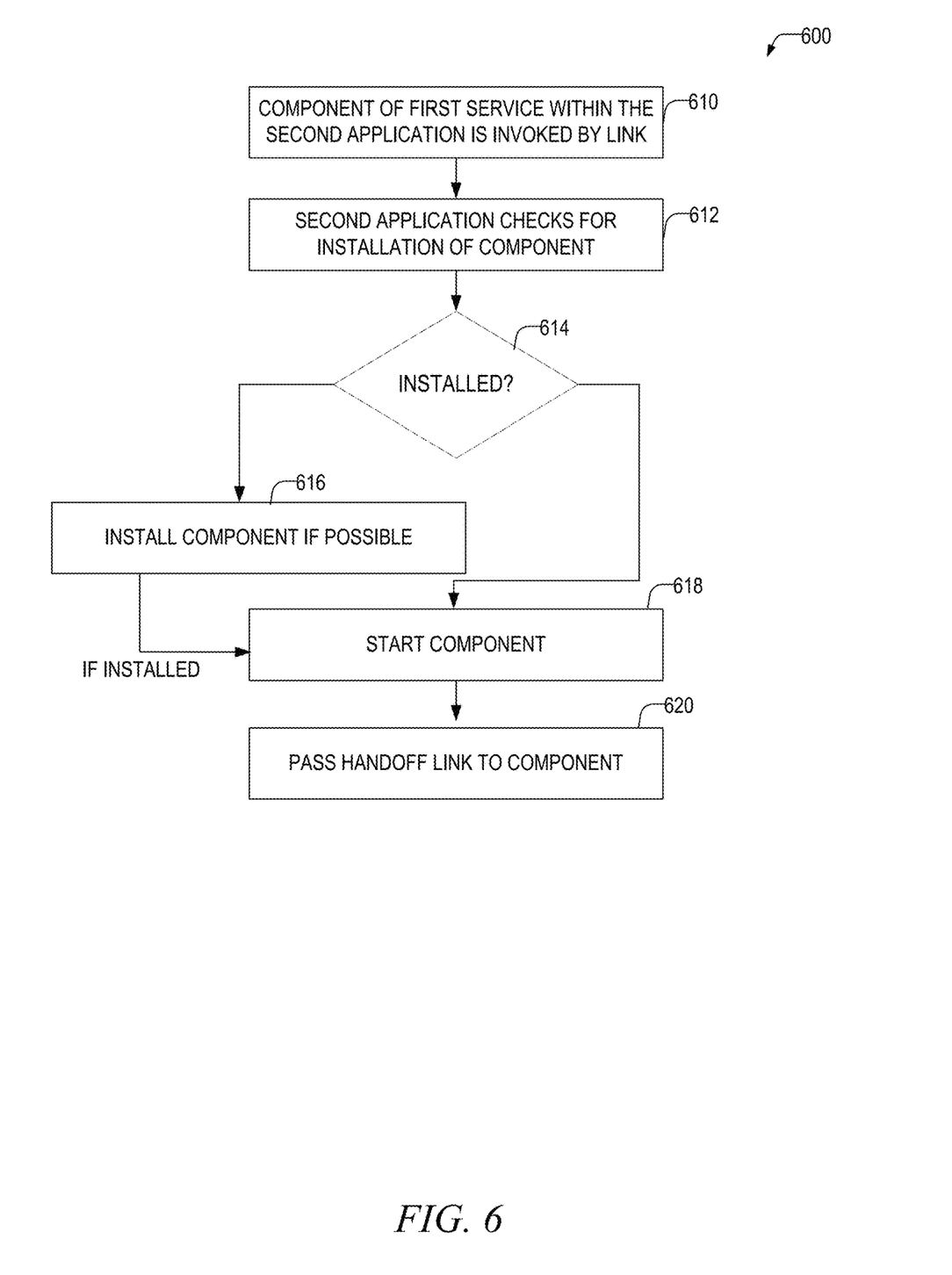
FIG. 6 illustrates a flowchart of a method for seamless authentication of a component of a first service executing within a second application (e.g., a collaboration application) according to some examples of the present disclosure.

FIG. 6 illustrates a flowchart of a method 600 for seamless authentication of a component of a first service executing within a second application (e.g., a collaboration application) according to some examples of the present disclosure. Method 600 may be performed by the second application. At operation 610, the component of the first service within the second application is invoked via a link, such as a deep link from the first application of the first service. At operation 612, the second application may parse the link and determine if the component of the first service is installed. If the determination at operation 614 is that the component is not installed, then at operation 616 the component may be installed. In some examples, installation may be blocked by various security policies. If the component can be installed, then the component may be downloaded, e.g., from a component data store and installed. Once the component is installed, or if it was already installed, then at operation 618 the second application may start executing the component if it is not already executing. At operation 620, the handoff link with the nonce may be passed to the component to allow the component to utilize the nonce to authenticate.

Figure 7:
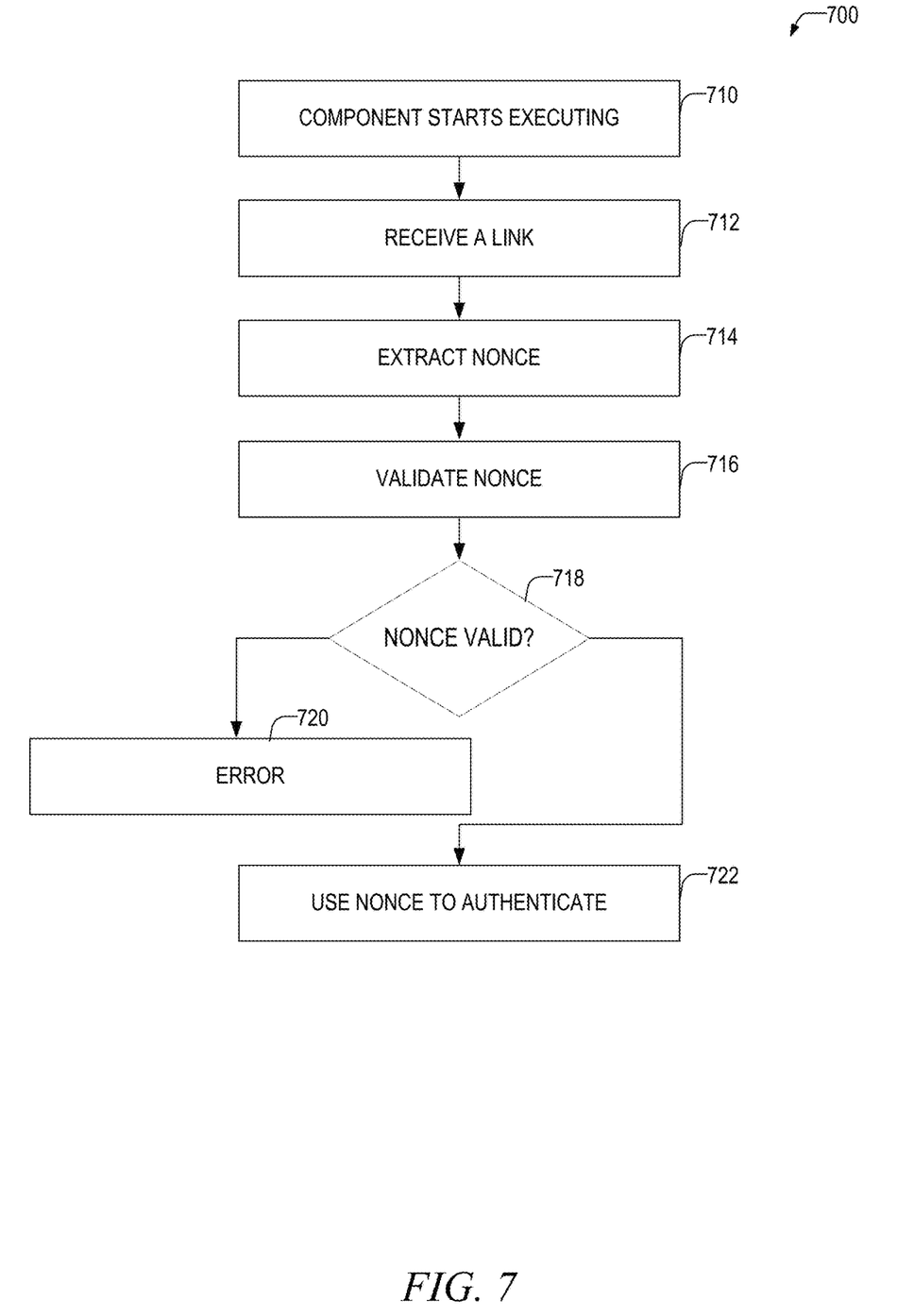
FIG. 7 illustrates a flowchart of a method for seamless authentication of a component of a first service executing within a second application (e.g., a collaboration application) according to some examples of the present disclosure.

FIG. 7 illustrates a flowchart of a method 700 for seamless authentication of a component of a first service executing within a second application (e.g., a collaboration application) according to some examples of the present disclosure. Method 700 may be performed by the component according to some examples of the present disclosure. At operation 710, the component starts executing. In some examples, this may be responsive to the user activating a deep link displayed by a first application of the first service. At operation 712, the component is provided the link from the second application—e.g., using inter-process communications or an API. At operation 714, the component may extract the nonce from the link. At operation 716, the component may attempt to validate the nonce. For example, by ensuring the nonce is of a proper size and format. If it is determined at operation 718 that the nonce is not valid, then at operation 720 the component may display an error to the user and ask that they login the standard way. If it is determined at operation 718 that the nonce is valid, then at operation 722, the component may utilize the nonce to authenticate with the first service. The component may then utilize the nonce to issue API requests to the first service.

Figure 8:
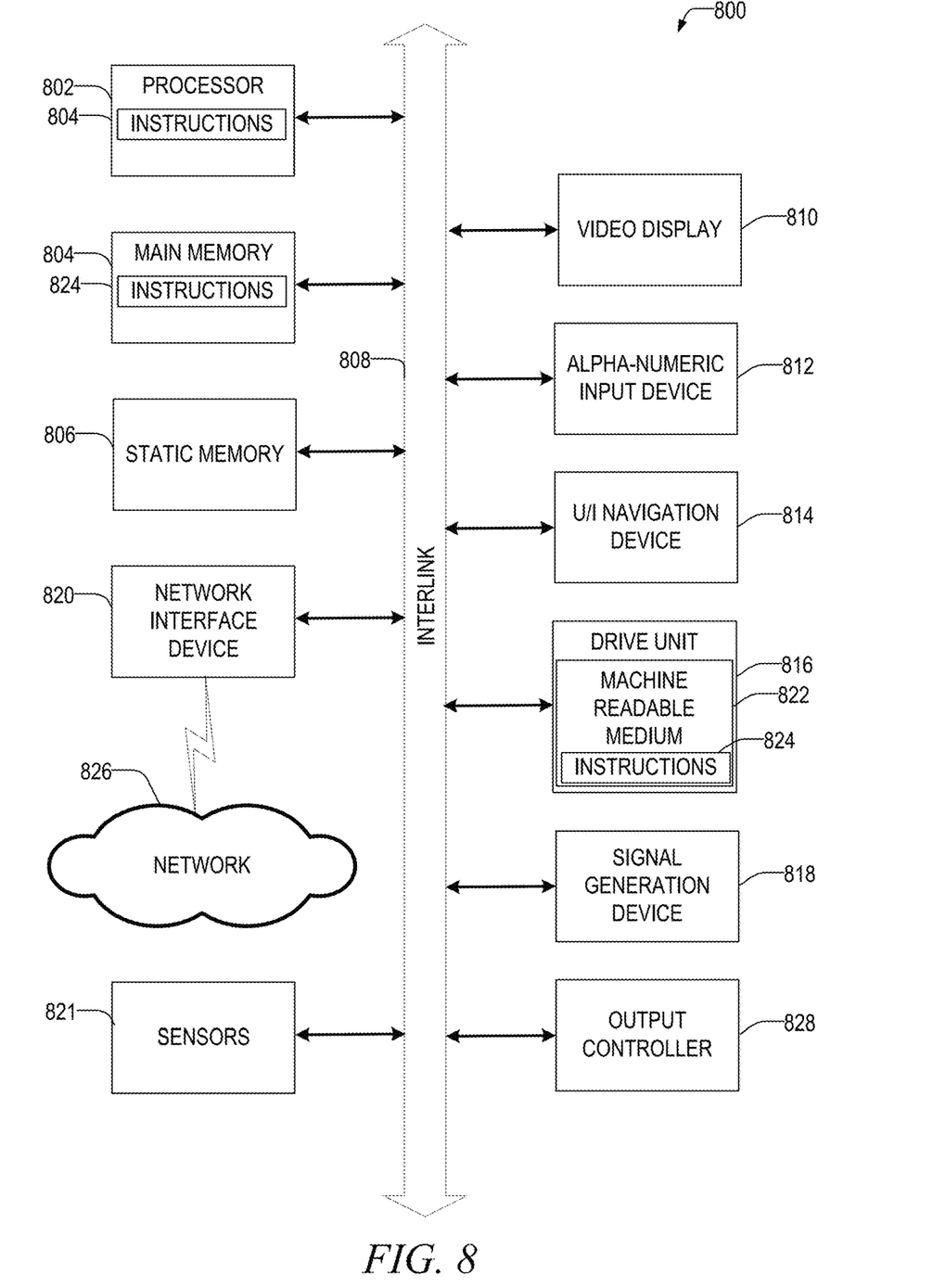
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a server computer (e.g., executing or part of a service), a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 may implement the GUIs of FIG. 1, FIG. 2, FIG. 3, any of the components of any of the devices shown in FIG. 4, any of the devices of FIG. 4, and implement any of the methods of FIGS. 5-7.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method for facilitating a seamless user authentication transition from a first application of a first service to a component of the first service executing within a second application of a second service, the method comprising: authenticating, by a server of the first application, a user; receiving, by the server of the first application, a request from a user to use a component included in the first service for invoking a function executing within the second application; responsive to authenticating the user by the server of the first application and receiving the request to use the component included in the first service: identifying, by the server, an access token indicative that the user is authenticated within the first application and a nonce value; creating a handoff link that includes, an instruction with an address that references the second application and includes the nonce value, wherein the handoff link is configured to initiate an authenticated session between the user and the function executing within the second application invoked by using the component; transmitting, by the server, the handoff link to a computing device corresponding to the second application; storing, by the server, a mapping of the nonce value to the access token in a mapping table, wherein the access token authenticates API calls to backend servers of the first application; receiving, by the server at the address corresponding to the handoff link, a request from the component included in the first service for invoking a function executing within the second application to authenticate the user with the component, the request comprising the nonce value; responsive to receiving the request from the component: validating the nonce value included in the request; responsive to validating the nonce value, using the received nonce value to retrieve the corresponding access token from the mapping table; and using the retrieved access token to authenticate API calls to servers of the first application responsive to requests from the component without requiring the component to re-authenticate.

In Example 2, the subject matter of Example 1 includes, wherein the second application is a unified communication application and wherein the component is an automated agent configured to interact with the user through natural language commands.

In Example 3, the subject matter of Examples 1-2 includes, wherein the handoff link is a deep link that directly opens the component within the second application.

In Example 4, the subject matter of Examples 1-3 includes, wherein the handoff link includes the nonce value as a continuationToken.

In Example 5, the subject matter of Examples 1~4 includes, wherein using the retrieved access token to authenticate API calls includes allowing the component to perform actions on behalf of the user within the first application.

In Example 6, the subject matter of Examples 1-5 includes, wherein upon receiving the handoff link, the second application checks if the component is installed, and if installed, activates the handoff link including the nonce to initiate the authenticated session.

In Example 7, the subject matter of Examples 1-6 includes, wherein upon receiving the handoff link, the second application checks if the component is installed, and if not installed, prompts the user to install the component, and upon successful installation, activates the handoff link including the nonce to initiate the authenticated session.

Example 8 is a system for facilitating a seamless user authentication transition from a first application of a first service to a component of the first service executing within a second application of a second service, the system comprising: one or more processors configured to perform operations comprising: authenticating, by a server of the first application, a user; receiving, by the server of the first application, a request from a user to use a component included in the first service for invoking a function executing within the second application; responsive to authenticating the user by the server of the first application and receiving the request to use the component included in the first service: identifying, by the server, an access token indicative that the user is authenticated within the first application and a nonce value; creating a handoff link that includes, an instruction with an address that references the second application and includes the nonce value, wherein the handoff link is configured to initiate an authenticated session between the user and the function executing within the second application invoked by using the component; transmitting, by the server, the handoff link to a computing device corresponding to the second application; storing, by the server, a mapping of the nonce value to the access token in a mapping table, wherein the access token authenticates API calls to backend servers of the first application; receiving, by the server at the address corresponding to the handoff link, a request from the component included in the first service for invoking a function executing within the second application to authenticate the user with the component, the request comprising the nonce value; responsive to receiving the request from the component: validating the nonce value included in the request; responsive to validating the nonce value, using the received nonce value to retrieve the corresponding access token from the mapping table; and using the retrieved access token to authenticate API calls to servers of the first application responsive to requests from the component without requiring the component to re-authenticate.

In Example 9, the subject matter of Example 8 includes, wherein the second application is a unified communication application and wherein the component is an automated agent configured to interact with the user through natural language commands.

In Example 10, the subject matter of Examples 8-9 includes, wherein the handoff link is a deep link that directly opens the component within the second application.

In Example 11, the subject matter of Examples 8-10 includes, wherein the handoff link includes the nonce value as a continuationToken.

In Example 12, the subject matter of Examples 8-11 includes, wherein the operations of using the retrieved access token to authenticate API calls includes allowing the component to perform actions on behalf of the user within the first application.

In Example 13, the subject matter of Examples 8-12 includes, wherein the operations further comprise upon receiving the handoff link, the second application checks if the component is installed, and if installed, activates the handoff link including the nonce to initiate the authenticated session.

In Example 14, the subject matter of Examples 8-13 includes, wherein the operations further comprise upon receiving the handoff link, the second application checks if the component is installed, and if not installed, prompts the user to install the component, and upon successful installation, activates the handoff link including the nonce to initiate the authenticated session.

Example 15 is a machine-readable storage device, storing instructions for facilitating a seamless user authentication transition from a first application of a first service to a component of the first service executing within a second application of a second service, the instructions, when executed by a machine, causes the machine to perform operations comprising: authenticating, by a server of the first application, a user; receiving, by the server of the first application, a request from a user to use a component included in the first service for invoking a function executing within the second application; responsive to authenticating the user by the server of the first application and receiving the request to use the component included in the first service: identifying, by the server, an access token indicative that the user is authenticated within the first application and a nonce value; creating a handoff link that includes, an instruction with an address that references the second application and includes the nonce value, wherein the handoff link is configured to initiate an authenticated session between the user and the function executing within the second application invoked by using the component; transmitting, by the server, the handoff link to a computing device corresponding to the second application; storing, by the server, a mapping of the nonce value to the access token in a mapping table, wherein the access token authenticates API calls to backend servers of the first application; receiving, by the server at the address corresponding to the handoff link, a request from the component included in the first service for invoking a function executing within the second application to authenticate the user with the component, the request comprising the nonce value; responsive to receiving the request from the component: validating the nonce value included in the request; responsive to validating the nonce value, using the received nonce value to retrieve the corresponding access token from the mapping table; and using the retrieved access token to authenticate API calls to servers of the first application responsive to requests from the component without requiring the component to re-authenticate.

In Example 16, the subject matter of Example 15 includes, wherein the second application is a unified communication application and wherein the component is an automated agent configured to interact with the user through natural language commands.

In Example 17, the subject matter of Examples 15-16 includes, wherein the handoff link is a deep link that directly opens the component within the second application.

In Example 18, the subject matter of Examples 15-17 includes, wherein the handoff link includes the nonce value as a continuationToken.

In Example 19, the subject matter of Examples 15-18 includes, wherein the operations of using the retrieved access token to authenticate API calls includes allowing the component to perform actions on behalf of the user within the first application.

In Example 20, the subject matter of Examples 15-19 includes, wherein the operations further comprise upon receiving the handoff link, the second application checks if the component is installed, and if installed, activates the handoff link including the nonce to initiate the authenticated session.

In Example 21, the subject matter of Examples 15-20 includes, wherein the operations further comprise upon receiving the handoff link, the second application checks if the component is installed, and if not installed, prompts the user to install the component, and upon successful installation, activates the handoff link including the nonce to initiate the authenticated session.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for facilitating a seamless user authentication transition from a first application of a first service to a component of the first service executing within a second application of a second service, the method comprising:
   authenticating, by a server of the first application, a user;
   receiving, by the server of the first application, a request from a user to use a component included in the first service for invoking a function executing within the second application;
   responsive to authenticating the user by the server of the first application and receiving the request to use the component included in the first service:
      identifying, by the server, an access token indicative that the user is authenticated within the first application and a nonce value;
      creating a handoff link that includes an instruction with an address that references the second application and includes the nonce value, wherein the handoff link is configured to initiate an authenticated session between the user and the function executing within the second application invoked by using the component;
      transmitting, by the server, the handoff link to a computing device corresponding to the second application;
      storing, by the server, a mapping of the nonce value to the access token in a mapping table, wherein the access token authenticates API calls to backend servers of the first application;
      receiving, by the server at the address corresponding to the handoff link, a request from the component included in the first service for invoking a function executing within the second application to authenticate the user with the component, the request comprising the nonce value;
      responsive to receiving the request from the component:
         validating the nonce value included in the request;
         responsive to validating the nonce value, using the received nonce value to retrieve the corresponding access token from the mapping table; and
         using the retrieved access token to authenticate API calls to servers of the first application responsive to requests from the component without requiring the component to re-authenticate.

2. The method of claim 1, wherein the second application is a unified communication application and wherein the component is an automated agent configured to interact with the user through natural language commands.

3. The method of claim 1, wherein the handoff link is a deep link that directly opens the component within the second application.

4. The method of claim 1, wherein the handoff link includes the nonce value as a continuationToken.

5. The method of claim 1, wherein using the retrieved access token to authenticate API calls includes allowing the component to perform actions on behalf of the user within the first application.

6. The method of claim 1, wherein upon receiving the handoff link, the second application checks if the component is installed, and if installed, activates the handoff link including the nonce to initiate the authenticated session.

7. The method of claim 1, wherein upon receiving the handoff link, the second application checks if the component is installed, and if not installed, prompts the user to install the component, and upon successful installation, activates the handoff link including the nonce to initiate the authenticated session.

8. A system for facilitating a seamless user authentication transition from a first application of a first service to a component of the first service executing within a second application of a second service, the system comprising:
   one or more processors configured to perform operations comprising:
      authenticating, by a server of the first application, a user;
      receiving, by the server of the first application, a request from a user to use a component included in the first service for invoking a function executing within the second application;
      responsive to authenticating the user by the server of the first application and receiving the request to use the component included in the first service:
         identifying, by the server, an access token indicative that the user is authenticated within the first application and a nonce value;
         creating a handoff link that includes an instruction with an address that references the second application and includes the nonce value, wherein the handoff link is configured to initiate an authenticated session between the user and the function executing within the second application invoked by using the component;
         transmitting, by the server, the handoff link to a computing device corresponding to the second application;
         storing, by the server, a mapping of the nonce value to the access token in a mapping table, wherein the access token authenticates API calls to backend servers of the first application;
         receiving, by the server at the address corresponding to the handoff link, a request from the component included in the first service for invoking a function executing within the second application to authenticate the user with the component, the request comprising the nonce value;
         responsive to receiving the request from the component:
            validating the nonce value included in the request;
            responsive to validating the nonce value, using the received nonce value to retrieve the corresponding access token from the mapping table; and
            using the retrieved access token to authenticate API calls to servers of the first application responsive to requests from the component without requiring the component to re-authenticate.

9. The system of claim 8, wherein the second application is a unified communication application and wherein the component is an automated agent configured to interact with the user through natural language commands.

10. The system of claim 8, wherein the handoff link is a deep link that directly opens the component within the second application.

11. The system of claim 8, wherein the handoff link includes the nonce value as a continuation Token.

12. The system of claim 8, wherein the operations of using the retrieved access token to authenticate API calls includes allowing the component to perform actions on behalf of the user within the first application.

13. The system of claim 8, wherein the operations further comprise upon receiving the handoff link, the second application checks if the component is installed, and if installed, activates the handoff link including the nonce to initiate the authenticated session.

14. The system of claim 8, wherein the operations further comprise upon receiving the handoff link, the second application checks if the component is installed, and if not installed, prompts the user to install the component, and upon successful installation, activates the handoff link including the nonce to initiate the authenticated session.

15. A machine-readable storage device, storing instructions for facilitating a seamless user authentication transition from a first application of a first service to a component of the first service executing within a second application of a second service, the instructions, when executed by a machine, causes the machine to perform operations comprising:

authenticating, by a server of the first application, a user;
 receiving, by the server of the first application, a request from a user to use a component included in the first service for invoking a function executing within the second application;
 responsive to authenticating the user by the server of the first application and receiving the request to use the component included in the first service:
  identifying, by the server, an access token indicative that the user is authenticated within the first application and a nonce value;
  creating a handoff link that includes an instruction with an address that references the second application and includes the nonce value, wherein the handoff link is configured to initiate an authenticated session between the user and the function executing within the second application invoked by using the component;
 transmitting, by the server, the handoff link to a computing device corresponding to the second application;
 storing, by the server, a mapping of the nonce value to the access token in a mapping table, wherein the access token authenticates API calls to backend servers of the first application;
 receiving, by the server at the address corresponding to the handoff link, a request from the component included in the first service for invoking a function executing within the second application to authenticate the user with the component, the request comprising the nonce value;
 responsive to receiving the request from the component:
  validating the nonce value included in the request;
  responsive to validating the nonce value, using the received nonce value to retrieve the corresponding access token from the mapping table; and
  using the retrieved access token to authenticate API calls to servers of the first application responsive to requests from the component without requiring the component to re-authenticate.

16. The machine-readable storage device of claim 15, wherein the second application is a unified communication application and wherein the component is an automated agent configured to interact with the user through natural language commands.

17. The machine-readable storage device of claim 15, wherein the handoff link is a deep link that directly opens the component within the second application.

18. The machine-readable storage device of claim 15, wherein the handoff link includes the nonce value as a continuationToken.

19. The machine-readable storage device of claim 15, wherein the operations of using the retrieved access token to authenticate API calls includes allowing the component to perform actions on behalf of the user within the first application.

20. The machine-readable storage device of claim 15, wherein the operations further comprise upon receiving the handoff link, the second application checks if the component is installed, and if installed, activates the handoff link including the nonce to initiate the authenticated session.

\* \* \* \* \*